(No Model.)
H. H. GEORGE.
BEARING FOR SHAFTS AND AXLES.
No. 552,902. Patented Jan. 14, 1896.
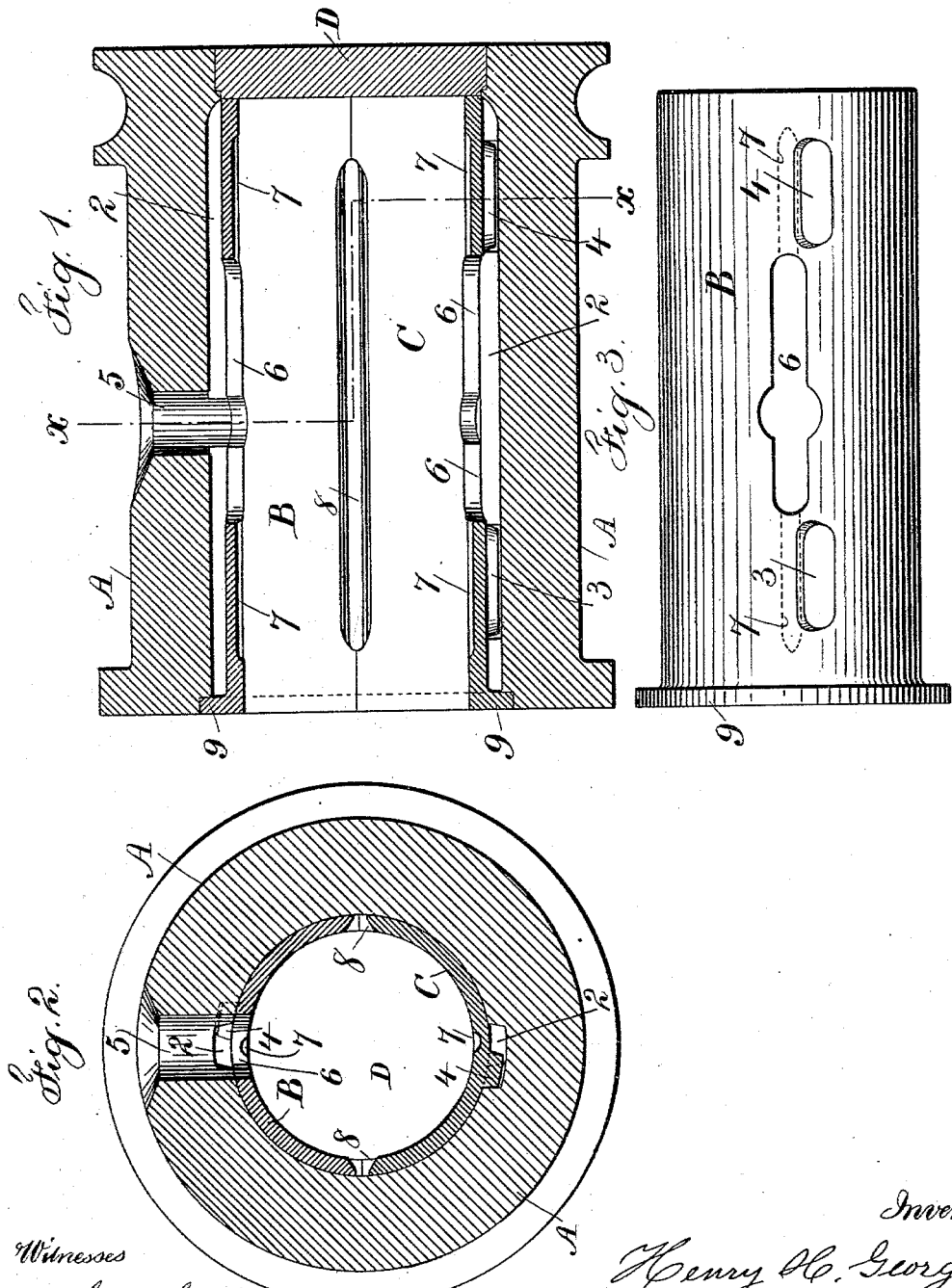

UNITED STATES PATENT OFFICE.

HENRY H. GEORGE, OF BROOKLYN, NEW YORK, ASSIGNOR TO JOHN GEORGE BUEHLER, OF SAME PLACE, AND JAMES H. SHELLEY, OF JERSEY CITY, NEW JERSEY.

BEARING FOR SHAFTS AND AXLES.

SPECIFICATION forming part of Letters Patent No. 552,902, dated January 14, 1896.

Application filed May 31, 1895. Serial No. 551,037. (No model.)

*To all whom it may concern:*

Be it known that I, HENRY H. GEORGE, a citizen of the United States, residing at Brooklyn, in the county of Kings and State of New York, have invented an Improvement in Bearings for Shafts and Axles, of which the following is a specification.

In car-axle boxes the bearing has in some instances been removable and reversible, so as to rest upon the axle and support the box and the weight of the car; but in connection with shafts, especially the armature-shaft in a car-motor, the bearing has usually been of Babbitt metal, poured into the recess in the journal-box, and hence the same is not easily removed, replaced, or reversed.

The present invention is made especially with reference to the bearing for the armature-shaft in car-motors; but it is available for other kinds of shafts, and I construct the bearing in two parts that can be slipped endwise into the journal-box, and the parts are interchangeable so that the bearing that may have been below the shaft and hence have received the weight and the wear of the shaft as it is rotated may be taken out and the upper bearing introduced below, so that the parts are interchangeable or reversible, and upon the removable bearings there are projections that pass into recesses in the axle-box and interlock, so that the bearing is held from rotating or from end movement, and in the bearing recesses or openings are made for oil to pass to the journal, and which openings or recesses also receive and retain a sufficient volume of oil to constantly lubricate the journal or shaft.

In the drawings, Figure 1 is a longitudinal section of the journal-box. Fig. 2 is a cross-section of the same at the line $x\,x$, Fig. 1; and Fig. 3 is an exterior view of one of the bearings detached.

The axle-box A may be of any desired size or shape. I have represented the same as cylindrical, as this form is convenient for supporting the armature-shaft in car-motors, and this axle-box has an opening which is cylindrical or approximately so and provided with longitudinal grooves 2, as hereinafter set forth.

The bearings B and C are similar and semi-cylindrical, and they are of a size to fit within the cylindrical opening in the box A, and each bearing is provided with lugs 3 4 that pass into the grooves 2, and these grooves 2 are made wider adjacent to the lugs 3 and 4 when the bearings are in position, so that the rotation of the shaft or journal within the bearings that partially turns these bearings, causes the lugs 3 and 4 to pass into the wider portions of the grooves and thus prevent end motion being given to the bearings within the box, so as to hold such bearings firmly in their position; but the bearings can be removed by partially turning them to bring the lugs into line with the longitudinal grooves and then pulling out one or both of such bearings.

The bearings B and C are similar, so that either one can be placed in the upper part or in the lower part of the axle-box. Hence when one bearing may have become worn in one position the bearings can be drawn out and their positions reversed.

An oil-hole is made at 5 through the axle-box, and in each bearing there is a longitudinal slot 6 to allow the oil that may be introduced into the hole 5 to pass to the shaft or journal, and it is also advantageous to provide grooves 7 as continuations of the slot 6, so that the oil or lubricating material extends to near the ends of the bearings.

The adjacent edges of the bearings B and C set closely together at the ends of said bearings; but the edges between the end portions are cut away or removed at 8, so as to form longitudinal channels between the two portions of the bearings, into which channels the lubricating material will pass and be retained so as to effectually lubricate the rotating journal or shaft.

I have represented the box A as closed at its outer end by a stationary disk D. This may be used or not, as desired. I have also represented flanges 9 at the ends of the bearings B C, passing into the annular recess in the axle-box. These flanges close the ends of the grooves so as to retain the lubricating material.

I claim as my invention—

1. The combination with the axle box in one piece having a cylindrical opening and longitudinal grooves, of the semi-cylindrical bearings B and C that are similar and adapted to being introduced endwise into the axle-box, there being lugs upon the exterior surfaces of the bearings to pass into the grooves of the axle box and slots for the lubricating material to pass through the bearings to the axle or journal and end flanges that close the longitudinal grooves, substantially as set forth.

2. The combination with an axle box in one piece having a cylindrical opening, of removable and interchangeable semi-cylindrical bearings each having an end flange and a slot for the lubricating material and cut away upon the adjacent edges to form longitudinal receptacles for the lubricating material, there being lugs on the exterior surfaces of the bearings and grooves widened at places in the interior of the axle box for receiving such lugs as the bearings are inserted and partially turned for holding the bearings in the box, substantially as set forth.

Signed by me this 21st day of May, 1895.

HENRY H. GEORGE.

Witnesses:
 JAS. GRADY,
 JOHN PAYN.